Figure 1:
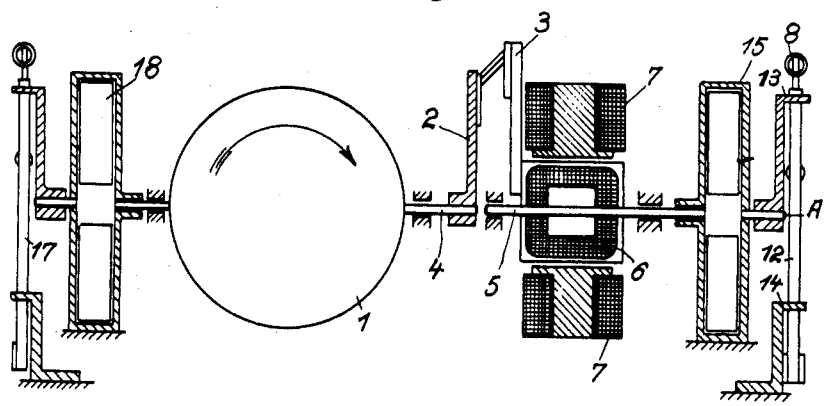

April 2, 1935.                 J. M. BOYKOW                  1,996,055
                                STABILIZER
                          Filed July 13, 1931            2 Sheets-Sheet 1

Inventor
Johann Maria Boykow
by Lorra & Kellenbeck
Attorneys.

April 2, 1935. J. M. BOYKOW 1,996,055
STABILIZER
Filed July 13, 1931 2 Sheets-Sheet 2

Inventor:
Johann Maria Boykow
by Lorra & Kehlenbeck
Attorneys.

Patented Apr. 2, 1935

1,996,055

UNITED STATES PATENT OFFICE 1,996,055

STABILIZER

Johann Maria Boykow, Berlin-Lichterfelde-West, Germany, assignor to Gesellschaft für Elektrische Apparate, m. b. H., Marienfelde near Berlin, Germany, a corporation of Germany Application July 13, 1931, Serial No. 550,512
In Germany July 16, 1930

5 Claims. (Cl. 172—239)

My invention relates to stabilizers, and more particularly to damped stabilizing devices for large bodies, such as aircraft and ships, or of apparatus mounted on oscillating bases, the stabilization of which is desirable.

It is well known to employ direction transmitters, such as gyroscopes, which become operative when the state of equilibrium of the body to be stabilized is upset to energize through suitable intermediate control members the control means proper, for instance switch in electric, hydraulic or pneumatic motors which, for example in aircraft and ships adjust the steering or elevating planes, or restore the state of equlibrium of the body by a displacement of weights, or turn the body to be stabilized in relation to its supporting base.

According to my present invention, any deviation of the body from its position of equilibrium is corrected with a powerful damping action irrespective of the magnitude of the masses of such body or of the magnitude of the disturbing forces or moments acting on the body to be stabilized.

In this invention, I employ a motor which returns the body to be stabilized, to its position of equilibrium, and this motor is controlled by a switch device connected with a switch relay. The latter in turn is controlled by a switch consisting of two members capable of relative movement. The position of one of these switch members depends on the deviation of the body to be stabilized, from its position of equilibrium; for instance, such switch member might be connected directly with such body. The other switch member is caused, by a follow-up device, to follow the movement of the first-mentioned switch member. This may be effected, for instance, by a torque generator located upon the axis of rotation of the second-mentioned switch member, and (like the switch relay controlling the said switch device) controlled by the two relatively movable members of the said switch.

In certain cases it may be desired to stabilize a searchlight or other body freely suspended on a ship or other craft or support subjected to oscillations, with the purpose of maintaining such body in a definite position irrespective of such oscillations of the support. In such cases the suspended body may carry one member of the switching device first mentioned above, namely the member the position of which depends on variations in the inclination. The other member of said switching device may for instance consist of contacts, and is given a follow-up movement by an electric torque generator connected with this switching device. This second or follow-up member of the switching device is preferably under adjustable spring control, so that the extent of follow-up movement may be adjusted by hand. With this switching device is connected the switch relay, which collects the switching impulses according to their direction and in accordance therewith actuates the regulating device of a motor which returns the body to be stabilized, to its position of equilibrium and at the same time throws the said switching device out of action.

Conditions are somewhat different in certain other cases, for instance when it is desired to stabilize an airplane about its transverse axis. In such cases the stabilizing motor will consist of the electric or hydraulic servo-motor which controls the elevator rudder of the craft. It will be evident that in this case it will not be feasible to secure rigidly to the airplane to be stabilized, that member which actuates the switching device first mentioned above in accordance with deviations of the craft from its position of longitudinal equilibrium. In this case, that particular member will have to be controlled by a gyroscope responsive to the longitudinal inclination of the craft or to the angular velocity of the craft about its transverse axis. The controlling mechanism will however, operate in exactly the same manner as under the conditions first referred to, and the member controlled by the gyroscope will co-operate with two companion controlling members (for instance, contacts) adapted to be given a follow-up movement by a torque generator. These companion controlling members (contacts) are connected with the switch relay controlling the regulating device of the motor controlling the rudder, said relay collecting according to their direction the impulses of the switch device actuated by the gyroscope.

In the drawings affixed to my specification and forming part thereof electrical embodiments of my invention are illustrated by way of example, but it will be readily understood that my improved apparatus may be modified in various ways, and may for instance also be operated hydraulically or pneumatically. It is furthermore by no means absolutely necessary that the direction transmitter, by which the control in initiated, consist of a gyroscope, but it might be equally well the receiver of a remote transmission system, a speedometer, an elevation indicator or any other appliance indicating a physical state or condition.

Referring to the drawings

Figure 3:
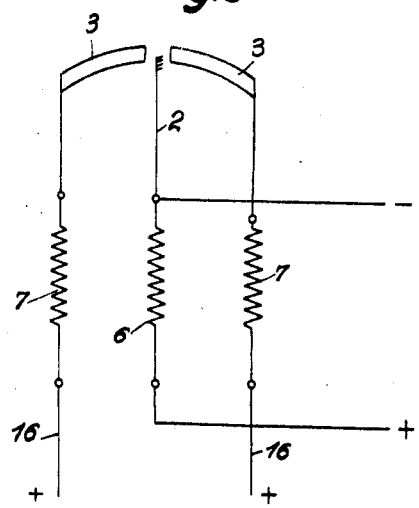
Figure 2:
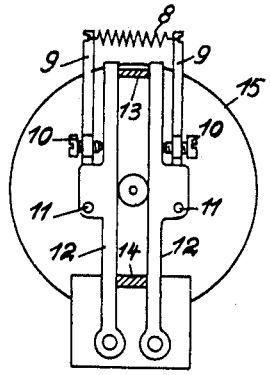
Figure 4:
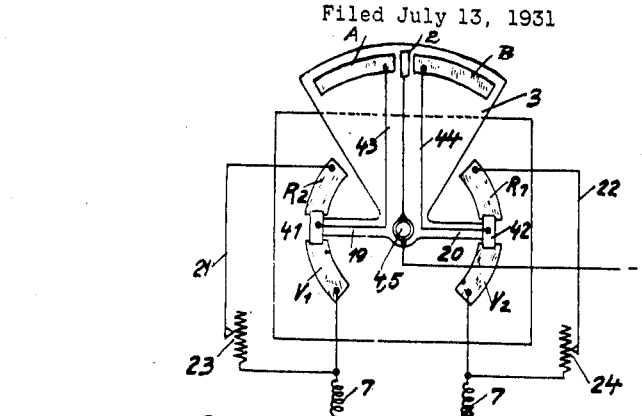
Figure 5:
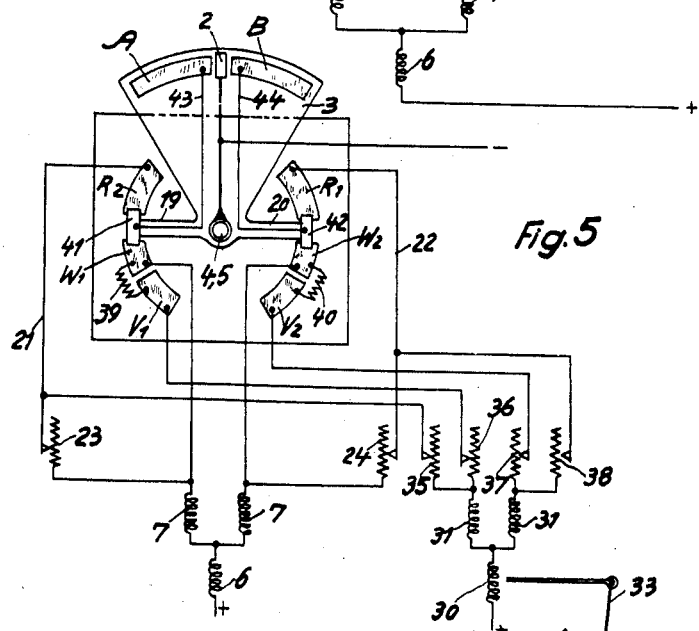
Figure 6:
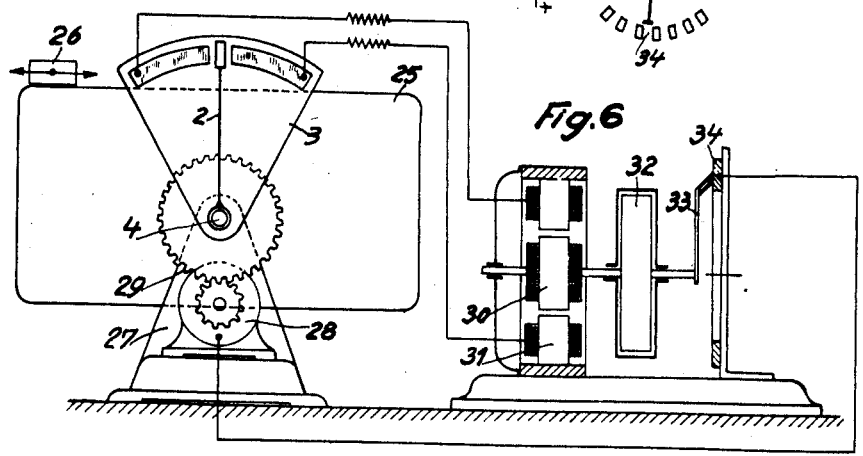

Fig. 1 illustrates diagrammatically a first embodiment of my invention with a gyroscope as direction transmitter, Fig. 2 shows separately the elastic or flexible holding device provided at the ends of this apparatus, Figs. 3 to 5 show constructions of controllers or switches and systems of connections according to my invention, and Fig. 6 is a diagrammatic representation of a second stabilizing device according to my invention with a relay for adjusting a supporting motor for the object to be stabilized.

Referring to Fig. 1 the direction transmitter is a gyroscope, and more particularly a gyroscope of which the degree of freedom of precession is limited by a zero spring. Its precession movement is furthermore damped in dependence on the speed of the precession, by for instance a liquid damping device. In a gyroscope with two degrees of freedom of precession the damping of the gyroscope may, of course, also take place around the other precision axis. In both cases it is, however, a condition that the damping value be at least approximately proportional to the speed of rotation around the axis. Such a gyroscope or gyroscopic unit 1 is equipped with a contact arm 2 adapted to slide across a contact track 3. This contact track is not stationary but is rotatable around the axis of a shaft 5, which axis is parallel to the precession axis represented by the axis of the shaft 4 carrying the arm 2. Upon the shaft 5 of the contact segment there is mounted the armature 6 in the reversible magnetic field 7 of an electro-magnetic torque generator which upon contact being made at 2, 3 is energized in such a sense that the contact segment 3 tends to break the contact again.

The armature of this torque generator is by means of a zero spring 8 resiliently maintained in a predetermined zero or neutral position when the torque generator is not energized. The spring acts upon arms 9 which are mounted on levers 12 and are adjustable upon pivots 11 by means of screws 10. An arm 13 mounted upon the shaft 5 passes between the levers 12 fulcrumed at their lower ends, while their position of rest is determined by a stop 14 common to them. The shaft 5 of the contact segment is damped, for instance by a liquid brake 15, in dependence on its speed of rotation.

The excitation of the torque generator and the resilient holding means in the zero position and also the damping are so chosen in relation to one another, that the speed of rotation of the contact segment due to the excitation of the torque generator and the speed of rotation with which this contact segment moves towards its zero position under the action of the resilient holding means when the torque generator is not excited, stand in such a relation to each other that the most favorable control action is obtained thereby. In the case of aircraft, for instance, this is the case when the speed of rotation under the control of the torque generator is considerably greater than the speed of rotation under the control of the zero spring. In an appliance mounted upon an oscillating base, for instance, conditions differ from case to case.

A further condition for the correct operation of the switch 2, 3 is that the zero spring should have such an initial tension that it will overcome the mechanical friction of this switch, in order that the switch may with certainty be returned into the zero or neutral position.

If the contact arm 2 of the gyroscope closes the circuit upon the segment 3 and thus energizes the torque generator 6, 7, it controls by the same contact, for instance across the line 16, the control valve of a hydraulic or pneumatic control machine or an electric motor which adjusts the rudder. Inasmuch as the contact segment 3 is turned by the torque generator, the duration of the operation of the servo-motor and thus the control motion and the position of the rudder itself dependent upon it are determined by the relative motion between the contact arm 2 and the segment 3. If the body to be stabilized, for instance an airplane, carries out a rotary movement, the gyroscope 1 which is limited in its degree of freedom from precession by an elastic or resilient return or retrieving device 17, which may be similar to the device 8 to 14 for the same object, performs a certain precession deflection. The movement of the gyroscope is also damped by a device 18. (In a gyroscope with two degrees of freedom from precession the retrieving device 17 and the damping device 18 may be mounted on one or the other of the precession spindles). The contact segment 3 will thus turn with a speed determined by the magnitude of the excitation of the torque generator 6, 7 and the damping device 15 as well as the pull of the spring 8, until it again opens the contact. During this entire time the motor adjusting the steering plane is likewise energized so that the resulting steering deflection becomes proportional to the disturbing angle velocity of the body, because the deflection of the contact arm 2 is equal to that of the gyroscope 1; the deflection of the gyroscope depends however upon the angular speed of the body to be stabilized. Assuming that the angular speed of the body continues undiminished despite the steering action, a reverse rotation of the contact segment 3 will be caused by the spring 8 after the disconnection of the torque generator 6, 7 which will continue until the segment again makes contact with the contact arm 2 of the control gyroscope. In this way the control motor is again temporarily energized in the same sense so that the control deflection is increased. This is repeated until under the action of the now slowly growing steering deflection the disturbing angle velocity decreases.

Assuming the border case that the disturbing angle speed decreases to such an extent that the rotary speed with which the precession deflection of the gyroscope 1 decreases becomes equal to the rotary speed with which the contact segment 3 returns into the neutral position under the action of the spring 8, the control or steering deflection remains unchanged for this per se small reduction of the angular speed.

If, however, the reduction of the precession angle of the gyroscope 1 takes place quicker than the reduction of the angle of deflection of the contact segment 3 under the action of the elastic retaining means, the control or steering movement itself is at this moment also reversed and the control angle of the steering plane is then already smaller at the reversing point of the motion of the body. If the angular speed is zero, the angle of precession is likewise zero, and the rudder is at this point of reversal already set back again so that in the normal course of the motion of the body it returns into its zero position earlier than the body itself and thus damps the motion of the body very energetically. This apparatus thus effectively avoids the so-called oversteering. Provisions are also made which permit of the regulation of the mutual relation of torque of the torque generator and the spring retaining device of the contact segment in accordance with the purpose in each particular case, for instance by the screws 10 or by a regulating resistance or rheostat connected in the circuit of the torgue generator 6, 7.

If a stationary disturbance occurs, for instance if an airplane to be stabilized around its transverse axis becomes front-heavy, the operation is as follows:

Due to the front-heaviness the airplane tends to dip forwardly. The gyroscope precesses and switches the steering motor on across the contact device 2, 3, until the front-heaviness is balanced by the inclined elevation rudder. The speed of the dipping motion caused by the front-heaviness now decreases due to the resistance of the air, but more slowly than would be the case in the same steering position without front-heaviness of the airplane. The elevation rudder will thus reverse less and on cessation of the dipping speed due to the head-heaviness will not stand at zero but will still have a certain deflection which quickly assumes that value at which the front- or head-heaviness is balanced. This position of the steering plane is, however, as long as the state of front-heaviness prevails the steering zero proper, around which position are now carried out the control movements necessary for maintaining the stability.

As other reference values in an aircraft may be made use of for stabilizing purposes, such as the velocity and the state of vertical acceleration or generally the position relatively to the gravity field or to the meridian, such reference values may according to my invention be caused to energize the torque generator 6, 7, in addition to the contact members of the gyroscope, so that in this case the zero position of the contact segment 3 will no longer agree with the zero position of the gyroscope 1, and thus automatically any desired influence may be exerted upon the steering gear of the aircraft.

It is of course also possible to allow these other reference values to act upon a similar intermediate control member, which is connected in series with or ahead of the torque generator 6, 7, so that in the action of these other reference values a lead occurs which likewise acts as a damping factor on the body to be stabilized. A position pendulum may thus, for instance, be imagined as a reference value. Assuming that the aircraft is inclined towards the front, the pendulum then excites the torque generator of the intermediate control member of the steering machine proper across the torque generator of its own intermediate control member. If the aircraft abandons its stationary inclination, i. e. if the steering gear has proved sufficient, the excitation of the intermediate control member 6, 7 without the intermediate control member would in a simple position pendulum continue until the airplane has returned into its correct position. If the position pendulum itself is however equipped with an intermediate control member the torque excitation also reverses its value and likewise influences the intermediate member proper in the reverse sense, although to a lesser extent, so that a damped return takes place into the position of stability.

In the apparatus illustrated in Figs. 1 to 3 of the drawings the conditions for the advance and reversal of the switch 2, 3 regulating the stabilization are fixed at a given adjustment of the values regulating their mode of operation.

Advance and reversal take place in an unvarying relation.

Such an apparatus may, however, by means of suitable control members and a corresponding connection be so designed that the control conditions for advance and reversal are adjustable at will within the limits set up by the apparatus used.

For facilitating the understanding of the operations taking place the following terms may be given the following meaning: advance of the pointer, a movement of the pointer for increasing the angle of deflection, and reversal of the pointer, a movement of the pointer for reducing the angle of deflection. It is, for instance, desired to let the advance of the control members take place quicker than their reversal, i. e. the follow-up device driving one control member necessary in the design illustrated in Figs. 1 to 3, is desired to work more energetically during the advance than during the reversal.

The follow-up movement of the segment is the rotary movement of the segment under the influence of the control process; reversal of the segment is the rotary motion of the segment merely under the control of the return or retrieving spring.

As a rule the follow-up movement during the advance should be more energetic than during the reversal, in order to bring about a damped stabilization. This regular case may in a special case be distorted to such an extent that the follow-up movement in the reversal becomes zero altogether.

According to Fig. 4 of the drawings this is attained by means of a double change-over switch. One change-over switch 2, 3 serves to change the direction of rotation of the follow-up device, as in the embodiment of my invention illustrated in Fig. 3, and the second change-over switch serves for varying the intensity of the field of the torque generator 6, 7, in such a way that the intensity of the field is greater during the advance than during the reversal. During the reversal the intensity of the field can be varied between zero and a maximum value.

According to another feature of my invention switching steps may be fitted into the individual switches for regulating the individual switching processes. Regulating resistances or rheostats may according to my invention also be generally placed in the individual circuits.

The apparatus according to the Figs. 1 to 3 is further supplemented by a switching relay which serves to adjust a motor used for the stabilization, for instance a supporting or auxiliary motor, for a certain torque adapted to the disturbance to be compensated.

One or a plurality of reference values may be allowed to act upon the relay the action of which is added in the relay and correspondingly balanced by the counter torque adjusted by the relay. This relay may likewise be designed in any suitable manner, and may for instance act electrically, electro-mechanically, hydraulically or pneumatically. The relay is preferably controlled by the same switches as the follow-up device.

I will now proceed to describe the change-over switch and the diagram of connections according to Fig. 4 of the drawings. Both are intended for a stabilizing apparatus as illustrated in Figs. 1 and 2. Like parts in Figs. 1 to 3 are marked by like letters in this figure. Thus 2 is again the contact arm, 3 the contact segment for switching a control machine; the shafts 4 and 5 of the switch arm and of the segment respectively align in this figure. 6 is the armature winding, 7 the field coils of the torque generator for making the segment follow up the contact arm. With the segment 3 are according to the invention mechanically connected switch arms 19 and 20 which sweep across stationary contact segments V1, V2, R1, R2, and the insulated contacts 41 and 42 of which are connected with the contacts A and B by wires 43 and 44. The contacts on the segment 3 cooperating with the contacts A and B are indicated by the indices 1 and 2 respectively. The switch according to Fig. 4 controls at the same time the control or steering machine and the torque generator 6, 7.

For varying the strength of the field of the torque generator there are provided the shunts 21 and 22 with the regulating resistances 23 and 24. By the contacts V1, V2 and R1, R2 it is possible to connect the field either directly or across the regulating resistances.

If the switch arm 2 runs on to the contact A, for instance, the control machine commences to work. Simultaneously the torque generator 6, 7 makes the contact segment 3 follow up. In this way one field winding 7 of the torque generator is directly switched in by means of the contact arm 19 and the contact V1. Current flows until the segment 3 has turned the contact arm up to the disconnection of the supply. If the stabilizing process is not yet completed, the spring 8, Fig. 1, again connects the control machine and the torque generator in circuit. The increase of the counter torque thus continues until the contact arm 2 reverses after the state of stability has been attained.

If the contact arm 2 now runs on to the contact B, the advance contact V1 is switched off and the reversal contact R1 switched on, so that the torque generator 6, 7 is switched on in the reverse direction of rotation and with a field strength reduced by the resistance 24. The same processes take place if the contact arm 2 runs on to the contact B. When the shunts 21, 22 are interrupted completely the follow-up torque operative in addition to the retrieving torque of the spring 8 can be completely neutralized during the reversal of the contact arm 2.

Before describing the wiring diagram shown in Fig. 5, it appears advisable to explain the stabilizing apparatus illustrated in Fig. 6.

Referring to Fig. 6, 25 is a body the state of equilibrium of which is to be stabilized. This body may be, for instance, a searchlight, telescope, or the like, that is to say an article supported in pendulous fashion upon a support subject to oscillations, such as a ship, where it is intended to keep the searchlight, telescope, or the like accurately in a definite position, for instance a horizontal or a vertical position, irrespective of the oscillations of the ship or other support. The body is assumed to be capable of turning around an axis 4. It is the gyroscope 1 of Figs. 1 to 3 replaced by the body to be stabilized itself. On the other side of the body 25 there is shown a mass 26 which by its eccentric location upsets the state of equilibrium of the body 25. The shaft 4 is journaled in a pedestal 27. Upon this pedestal is mounted a supporting motor 28 adapted to act upon the shaft 4 of the body 25 by any suitable means, for instance by means of spur wheels 29. The shaft 4 carries the contact arm 2, and upon it is adapted to rotate the contact segment 3.

The follow-up turning device 6, 7 the damping device 15 for the follow-up motion and the retrieving device 9 to 14 with the retrieving spring 8 are not shown in Fig. 6. They are located in the extension of the shaft 4, exactly as in Fig. 1 of the drawings. As compared with the apparatus illustrated in Fig. 1 a control relay has been added, which consists of a moving coil 30 in a magnetic field 31, a damping device 32, a contact arm 33 and a stationary contact segment 34. The contact segment 34 with the contact arm 33 form a step switch for the motor 28 in the nature of a starter.

The switch and the connections for the stabilizing device just described are diagrammatically shown in Fig. 5 of the drawings. As far as this figure corresponds with Fig. 4 like reference signs have been employed, i. e. the two switches 2, 3 and 19, 20, 41, 42, V1, V2, R1, R2 as well as the connection and the design of the torque generator 6, 7 are identical with those in Fig. 4. In addition to the torque generator there are, however, connected to the contacts V1, V2, R1, R2, the field 31 and the armature 30 of the control relay. Regulating resistances 35, 36, 37, and 38 connected in shunt one with the other are placed between the control relay and the contacts V1, V2 and R1, R2, so that the operating speed of the relay is also adjustable at will for advance and reversal. Contacts W1 and W2 are furthermore placed between the contacts V1, R2 and V2, R1 respectively in the change-over switch, which contacts W1 and W2 through resistances 39 and 40 are connected to the contacts V1, V2 respectively. Any suitable number of contacts W1 and W2 and of resistance steps may be provided.

The mode of operation of the stabilizing device according to Fig. 6 and of the system of connection according to Fig. 5 is identical, as far as the parts correspond, with the device described with reference to Figs. 1 to 3 and the system of connections according to Fig. 4. In addition thereto the control relay is operated by the switch. This control relay produces a supporting torque corresponding with the disturbing torque of the eccentric mass 26, inasmuch as its contact arm 33 is adjusted in one direction or the other as current rushes of more or less long duration occur at the contacts A and B through the contact arm 2.

During the advance of the contact arm 2 on to the segment A, for instance, the control relay starts in one direction, during advance on to the contact B in the other direction. On reverse rotation from the contacts A and B towards the midpoint the control relay comes to rest damped and in a position corresponding with the weight position of the body 25. In this position the supporting motor 28 is connected in circuit with a definite torque. If a change occurs in the state of equilibrium thus set up, i. e. if the body 25 performs an oscillation, the contact arm 2 is deflected and changes the position of the control or switching relay and thus the value of the supporting torque.

If the disturbance of the equilibrium is considerable the deflection of the contact arm 2 also grows rapidly, so that the contact segment 3 follows up quickly by such a large angle that its switch arms 19 and 20 run across the intermediate contacts W1, W2 on to the advance contacts V1 or V2 respectively, cutting out the resistances 39, 40 respectively, so that a quick increase of the supporting torque of the motor 28 takes place. In the event of less considerable disturbances, when running onto the contacts $W_1$, $W_2$ is sufficient, the action of the control relay is slowed down by the resistances 39, 40.

If due to a disturbance the body 25 swings out of its position of equilibrium, this disturbing oscillation continues in the same direction until the supporting motor 28 balances it. Despite this fact the control relay continues to operate in the same direction and increases the torque of the supporting motor 28, because even when the arm 2 comes to rest the contact segment 3 continues to operate, because on the contact segment there acts on the one hand the follow-up rotating device 6, 7, and on the other hand the retrieving spring 8. The follow-up device turns the segment to follow the contact arm 2 until a cutting out takes place whereupon the spring 8 brings about a fresh closure of the circuit by turning the segment 3 until its contact A or B engages the contact arm 2. This is repeated until the torque of the motor 28 overbalances the inertia of the bodies 25, 26 and initiates a reverse rotation of the body. This reverse rotation takes place at a speed decreasing towards the position of equilibrium so that the return of the body 25 into the position of equilibrium is damped. This follows from the fact that as long as the now reversing contact segment 3 leads in relation to the reversing contact arm 2 the torque of the supporting motor 28 is still further increased. As soon as the contact arm 2 commences to lead in relation to the contact segment 3, a reduction of the supporting torque takes place due to the contact arm 2 running on to the oppositely acting contact of the contacts A and B. The reversal of the segment 3 by the spring 8 into the inoperative position takes place with constantly decreasing angular speed so that the reversal speed of the contact arm 2 and thus also that of the body 26 to be stabilized decreases constantly. Expressing it in other words, the body 25 swings back into the position of rest at a speed which depends upon the regulable reversal speed of the contact segment 3.

I claim as my invention:

1. In a stabilizer of the class described, the combination of a body to be stabilized, a stabilizing motor operatively connected with said body, switching means for controlling the operation of said motor, a relay, operative connections between asid relay and said switching means to shift the latter to different positions, a second switching device, operatively connected with said relay to control the latter and consisting of two members movable relatively to each other, one of said members being connected with the body to be stabilized, and a follow-up mechanism connected with the other member of said second switching device, said mechanism including a torque generator connected with said second switching device to be controlled thereby.

2. In a stabilizer of the class described, the combination of a body to be stabilized, a stabilizing motor operatively connected with said body, switching means for controlling the operation of said motor, a relay, operative connections between said relay and said switching means to shift the latter to different positions, a second switching device, operatively connected with said relay to control the latter and consisting of two members movable relatively to each other, one of said members being connected with the body to be stabilized, and a follow-up mechanism connected with the other member of said second switching device, said mechanism including a torque generator adjustably connected with said second switching device and a liquid brake coupled with the said torque generator.

3. In a stabilizer of the class described, the combination of a body to be stabilized, a stabilizing motor operatively connected with said body, switching means for controlling the operation of said motor, a relay, operative connections between said relay and said switching means to shift the latter to different positions, a second switching device, operatively connected with said relay to control the latter and consisting of two members movable relatively to each other, one of said members being connected with the body to be stabilized, and a follow-up mechanism connected with the other member of said second switching device, said mechanism including a torque generator adjustably connected with said second switching device and also including a liquid brake and an elastic return device both connected adjustably with the torque generator.

4. In a stabilizer of the class described, the combination of a body to be stabilized, a stabilizing motor operatively connected with said body, switching means for controlling the operation of said motor, a relay, operative connections between said relay and said switching means to shift the latter to different positions, a second switching device, operatively connected with said relay to control the latter and consisting of two members movable relatively to each other, one of said members being connected with the body to be stabilized, an electromagnetic torque generator coupled with the other member of said second switching device, a change-over switch coupled with one of said members, and means for connecting said electromagnetic torque generator through said change-over switch with said second switching device.

5. In a stabilizer of the class described, the combination of a body to be stabilized, a stabilizing motor operatively connected with said body, switching means for controlling the operation of said motor, a relay, operative connections between said relay and said switching means to shift the latter to different positions, a second switching device, operatively connected with said relay to control the latter and consisting of two members movable relatively to each other, one of said members being connected with the body to be stabilized, an electromagnetic torque generator coupled with the other member of said second switching device, a change-over switch coupled with one of said members, electrical regulating resistances connected with said electromagnetic torque generator, and connections by which said torque generator is connected through said change-over switch with the two members of said second switching device both directly and through said regulating resistances.

JOHANN MARIA BOYKOW.